United States Patent [19]

Flach

[11] Patent Number: 5,140,172

[45] Date of Patent: Aug. 18, 1992

[54] INTERFACE MODULE FOR A BUS INTERFACE

[75] Inventor: Werner Flach, Amberg, Fed. Rep. of Germany

[73] Assignee: Siemens Aktiengesellschaft, Berlin & Munich, Fed. Rep. of Germany

[21] Appl. No.: 589,333

[22] Filed: Sep. 27, 1990

[30] Foreign Application Priority Data

Sep. 28, 1989 [EP] European Pat. Off. ............ 89117940

[51] Int. Cl.⁵ ............................................. H04L 12/00
[52] U.S. Cl. ........................................ 307/112; 375/36
[58] Field of Search ................... 370/85.7, 94; 375/7, 375/8, 36, 121; 178/69 C; 340/825.5; 307/112

[56] References Cited

U.S. PATENT DOCUMENTS 4,736,394 4/1988 Giovanelli et al. ................ 375/36
4,882,554 11/1989 Akaba et al. ...................... 333/105

FOREIGN PATENT DOCUMENTS 0163361 12/1985 European Pat. Off. .
2226737 7/1990 United Kingdom ............ 178/69 C

OTHER PUBLICATIONS

Elektronik, vol. 35, No. 19, Sep. 19, 1986, München, DE, pp. 146–154; R. Wilson: "Hochleistungsnetze Für Peripheriegeräte-Aufbau von SCSI- und IPI-Schnittstellen mit RS-485 Transceivern".

Elektronik, vol. 36, No. 13, Jun. 26 1987, pp. 86–94, München, DE; A. Djenguerian: "Praktisher Aufbau Eines Ethernet-/Cheapernet-Anschlussknotens".

IBM Technical Disclosure Bulletin, vol. 24, No. 8, Jan. 1982, pp. 4041–4042; New York, US, R. Keller et al.: "Local Attachment of a Station to a Ring Network Through a Distribution Panel and a Coaxial Cable".

Primary Examiner—Jeffrey A. Gaffin
Attorney, Agent, or Firm—Kenyon & Kenyon

[57] ABSTRACT

A user-friendly interface module which makes possible a simple structural attachment to a standardized bus interface having good suppression of interferences as well as a non-volatile termination of a two-wire line bus. The interface module includes a housing with an external ground terminal clip and four terminals. The interface module also includes a resistive divider to terminate the two-wire line bus as well as a multicore cable. Communication is established, for example with a microprocessor, via the multicore cable. The interface module can be used in a network system with programmable controllers.

15 Claims, 3 Drawing Sheets

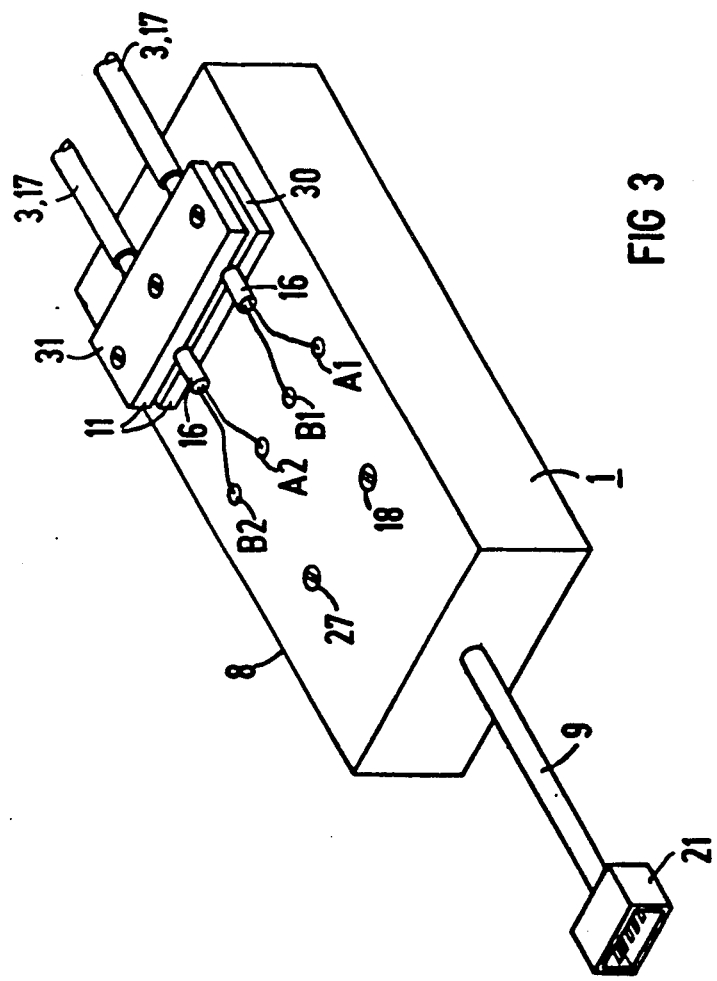

INTERFACE MODULE FOR A BUS INTERFACE

BACKGROUND OF THE INVENTION

The present invention relates to an interface device, and more particularly to a device for connecting a user station of a communications system, for example, a programmable controller, to a two-wire line bus.

In previous devices for connecting a user station of a communications system to a two-wire line bus, the connection means have been integrated into the circuitry of the user station. For example, in the case of modules, the means of connection is incorporated in the architecture. However, coupling such a connection means to the two-wire line bus is quite cumbersome. Under certain conditions, installing the connection means is impractical or impossible because of a lack of space. Therefore these modules do not easily connect a user station of a communication system to a two-wire line bus. Furthermore, there is no simple means of multiplying the interfaces.

SUMMARY OF THE INVENTION

These and other problems of interface modules are overcome by the present invention for an interface module for a bus interface. The present invention comprises a user-friendly connection means which makes possible a simple means to connect a standardized bus interface to a two-wire bus and which provides both good suppression of interferences as well as a non-volatile termination of the two-wire line bus.

The interface module of the present invention is coupled between the bus interface of a user station of a communications system and a two-wire line bus. The bus interface has two interface terminals for transferring a differential signal. The bus interface also has a third interface terminal for supplying voltage and a fourth interface terminal to connect to ground. The interface module has a housing, which is provided with a ground terminal clip and four terminals to connect a shielded cable, two-wire line bus. A first coupling component sets the neutral position of the two-wire line bus. An optional coupling component can be used to terminate the two-wire bus or couple the two-wire bus to a multicore cable. The first and second terminals of the four terminals are electrically coupled together as are the third and fourth terminals. The first terminal is coupled to a first core of the multicore cable. Also, the third terminal is coupled to a second core of the multicore cable.

The user station may be a bus interface such as that disclosed in the RS 485 Interface and EIA-Standard RS 485, Elektronik 19, Sep. 19, 1986, pp. 146-154 having third and fourth terminals for supplying voltage and grounding respectively.

For a good suppression of interferences, the ground terminal clip comprises a metal base and a terminal clamp, by which the shield of the shielded cable can be solidly held and pressed against the metal base. In order to couple a ground cable to the interface module, an additional, fifth terminal is provided which is accessible from outside of the housing and is coupled to the ground terminal clip by a solid conductor.

With regard to the preparation of the cable by the customer, one end of the multicore cable has a multipole power plug for connection to the bus interface and the other end of the multicore cable can be plugged into a terminal unit, and via this terminal unit, is electrically connected to the first, second, third and fourth terminals and to the first coupling component. A simple and advantageous design is provided when the first coupling component is designed as a resistive divider which is coupled between the two interface terminals via the multicore cable and can be electrically coupled to the first and third terminals for the two-wire line bus. In this manner, a non-volatile termination of the two-wire line bus is created.

In order to allow an easily opened and closed electrical connection, the resistive divider is electrically coupled via switches to the first and third terminals for the two-wire line bus. A simple handling of the interface module is provided for the customer because the connection of the first and second coupling components to the supply can be performed outside the housing with everyday tools, such as a screwdriver. If a second terminal unit is provided with the same operative connections as the first terminal unit, then the connection of an additional user station is possible using the device of the present invention

BRIEF DESCRIPTION OF THE DRAWINGS

FIG. 3 is a perspective view of the structural design of the interface module constructed according to the embodiment of the present invention.

DETAILED DESCRIPTION

Figure 1:
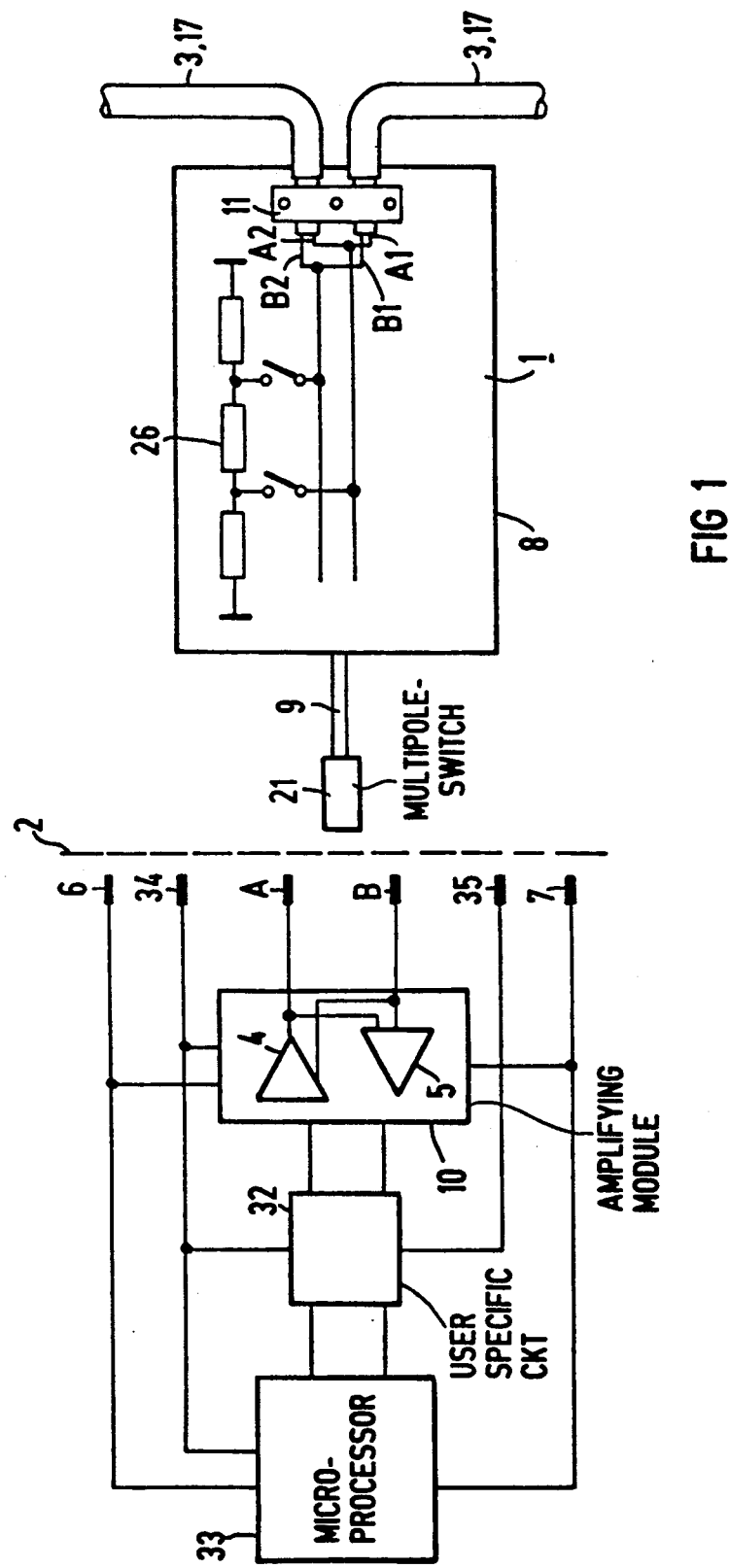
FIG. 1 is a block diagram of a standardized bus interface and an interface module which has been adapted to the bus interface constructed according to the present invention.

Referring to FIG. 1, a standardized bus interface 2 of a user station in a communications system and an interface module 1 which has been adapted to this standardized bus interface 2 are shown. The user station is indicated in this embodiment by a microprocessor 33. The exchange of signals between the standardized bus interface 2 and a two-wire line bus 3 takes place with a differential signal via two interface terminals A and B. These interface terminals A and B are coupled to an amplifying module 10 (e.g. a driver block) having a transmitter 4 and a receiver 5, in order to transmit and receive the differential signal. In addition, the bus interface 2 includes a third interface terminal 6 to supply voltage which is made available by the user station and which supplies voltage to the amplifying module 10. Moreover, the amplifying module 10 is coupled to a fourth interface terminal 7. The ground of the user station is coupled to this fourth interface terminal 7.

In an application involving modems, a corresponding, user-specific circuit 32 is provided. On one hand, signals are transferred over the user-specific circuit 32 between the transmitter 4 and the receiver 5 and, on the other hand, to the microprocessor 33. An interface terminal 34 is additionally required in the use of modems to transfer the RTS (request to send) signals and an interface terminal 35 is required for silence recognition. Both interface terminals 34 and 35 are coupled to the user-specific circuit 32 and are electrically coupled to the microprocessor 33. However, the connections between the interface module 1 and the interface terminals 34 and 35 can be dispensed with in those applications which do not use modems The interface module 1 has a housing 8. A two-wire line bus 3, which in this case is a shielded cable 17, is coupled to one side of the housing 8. A multicore cable 9 having a multipole power plug 21 is coupled to the other end of the housing 8. To connect the interface module 1 to the two-wire line bus 3, the shielded cable 17 is split.

Figure 2:
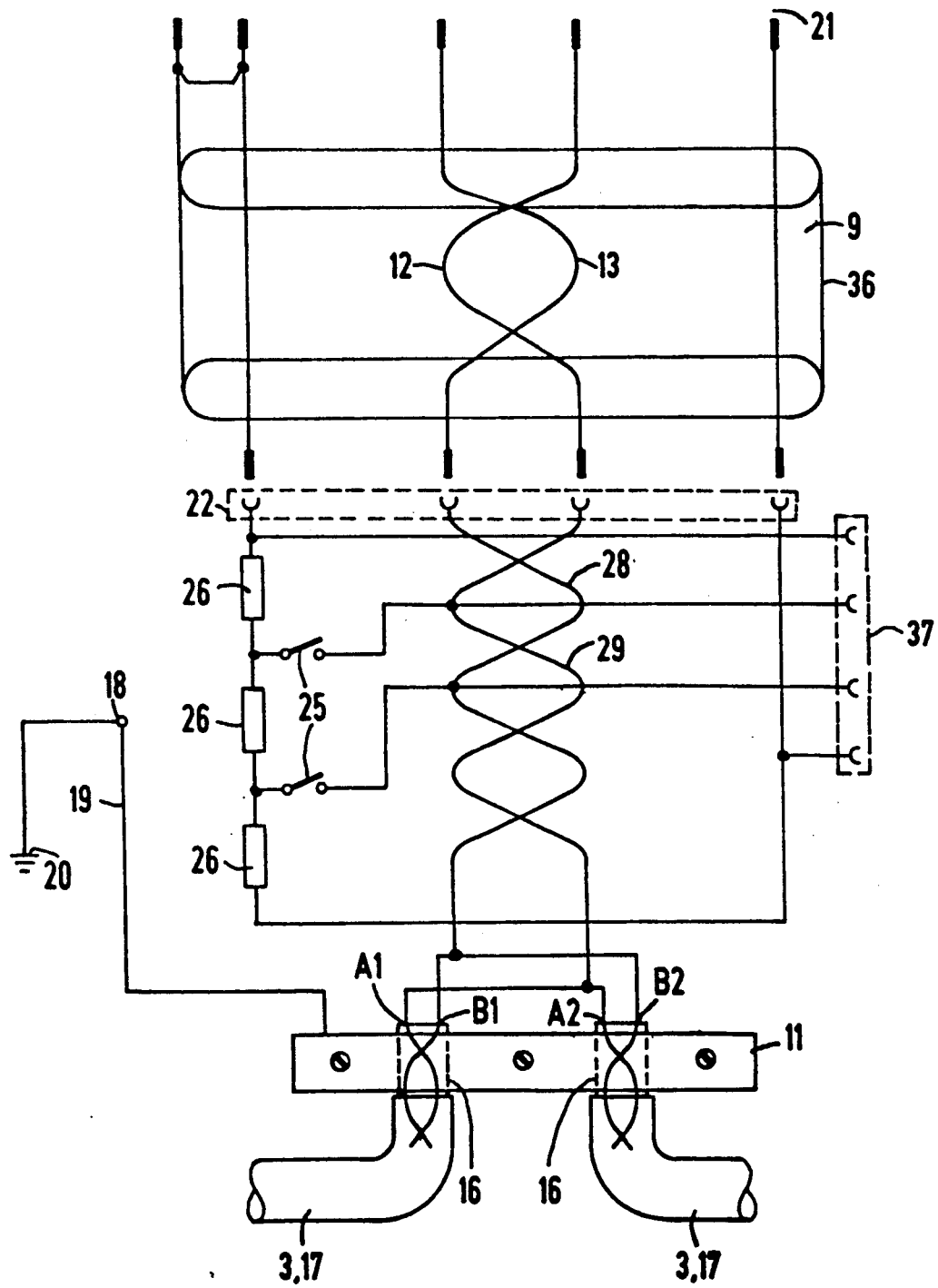
FIG. 2 is a circuit diagram of the electric circuitry of the interface module constructed according to the embodiment of the present invention.

Referring to FIG. 2, the detailed electric circuitry of the interface module 1 is shown. After splitting each of the shielded cables 17, the newly formed shields 16 are clamped to a ground terminal clip 11. The ground terminal clip 11 is coupled to the station ground 20 by a solid conductor 19. The ground terminal clip 11 is located outside of the housing 8 and in this manner, a simple shielding of the cable 17 is guaranteed. Four terminals A1, A2, B1 and B2 are provided to couple the signal lines to both ends of the shielded cable 17. Terminals A1 and A2 are electrically coupled together, and terminals B1 and B2 are electrically coupled together. The four terminals A1, A2, B1, and B2 are electrically coupled by two lines 28 and 29 to two terminal units 22 and 37. One user station can be coupled to these terminal units 22 and 37 via a multicore cable 9 which is shown here arranged for connection to terminal unit 22. An additional multicore cable can be provided for connection to terminal unit 37. The multicore cable 9 has a shield 36 for suppressing interferences. Two cores 12 and 13 of the multicore cable 9 are coupled to the interface terminals A and B via a multipole power plug 21.

A resistive divider 26, which comprises three ohmic resistors, is coupled between two terminals of the terminal unit 22. A switch 25 is coupled to each of the connection points between two adjacent resistors 26. One of the switches 25 is coupled to line 28 and the other switch 25 is coupled to line 29. The multicore cable 9 includes two cores 12 and 13, over which the actual signal is carried. The multicore cable 9 can be plugged into the terminal unit 22. The multicore cable 9 also establishes a connection between the interface terminal 6 and the voltage supply of the terminals 22 and 37. The multicore cable 9 also establishes a connection between the interface terminal 7, the ground attachment of the terminals 22 and 37 and the divider circuit 26. With the divider circuit 26, the prebiasing of the two-wire line bus 3 is established, that is, its neutral position. Also, the divider circuit 26 establishes the termination of the two-wire line bus 3, which is accommodated in the interface module 1 in a non-volatile manner.

Referring to FIG. 3, the structural design of the interface module 1 is shown. The interface module 1 comprises a housing 8. A ground terminal clip 11 is attached to the top of the housing 8. The ground terminal clip 11 comprises a metal base 30 and a terminal clamp 31. Four neighboring mounted terminals A1, B1, A2, and B2 are provided on the housing 8. Furthermore, a terminal 18, which is coupled to the ground terminal clip 11 via a solid conductor 19 (not shown), and a screw 27 are provided. Both switches 25 (FIG. 2) can be controlled via the screw 27 by means of a screwdriver, in order to switch the divider circuit 26 on or off. In this manner, the termination and neutral position of the two-wire line bus 3 can be produced. Moreover, the multicore cable 9 is coupled between the interface module 1 and the multipole power plug 21. The multipole power plug 21 is for coupling the interface module 1 to the standardized bus interface 2. Another multipole power plug (not shown), coupled to the interface module makes possible the electrical connection to the terminal unit 22 (FIG. 2).

The solid design of the ground terminal clip 11 makes possible a good connection to ground of the shielded cable 17. A cable for the purpose of grounding can be coupled via the terminal 18, when a station ground 20, which is directly coupled to the housing 8, is not present. The housing 8 can be snapped on by a snapping mechanism (not shown) on the back of the interface module 1 in order to hold it on a bar. A ground spring, which is in contact with the ground terminal clip 11, contacts the station ground which is coupled over the bars.

What is claimed is:

1. An interface module for coupling a bus interface of a user station of a communications system and a two-wire line bus incorporated in a cable having an electric shield, the bus interface comprising first and second interface terminals for transferring a differential signal, a third interface terminal for supplying voltage to the user station, and a fourth interface terminal for providing a ground to the user station, the interface module comprising:

a housing;

a ground terminal clip coupled to said housing;

first, second, third and fourth terminals coupling the interface module and the two-wire line bus, said first terminal coupled to said second terminal and said third terminal coupled to said fourth terminal;

a first coupling component setting the neutral position of the two-wire line bus;

a second coupling component optionally terminating the two-wire line bus;

a multicore cable having a first and a second end, said multicore cable having a first core component and a second core component, said first core component coupled to said first terminal, and said second core component coupled to said third terminal.

2. The interface module of claim 1, wherein said ground terminal clip comprises:

a metal base;

a terminal clamp coupled to said metal base, said terminal clamp securing the shield of said two-wire line bus between the terminal clamp and the metal base.

3. The interface module of claim 1 further comprising:

a solid conductor;

an externally accessible fifth terminal coupled to said ground terminal clip via said solid conductor.

4. The interface module of claim 1, further comprising:

a multipole power plug coupled between the first end of said multicore cable and the bus interface;

a first terminal unit coupled between the second end of said multicore cable and said first, second, third and fourth terminals and said first coupling component.

5. The interface module of claim 1, wherein said first coupling component comprises a series of ohmic resistors having a resistive divider connection, said first coupling component coupled between said first and second interface terminals and said multicore cable, said first coupling component optionally coupled to said first and third terminals.

6. The interface module of claim 5, wherein said second coupling component comprises a series of switches coupled between said first coupling component and said first and third terminals.

7. The interface module of claim 6, wherein said second coupling component is operated externally of said housing.

8. The interface module of claim 7, wherein said coupling of said first coupling component to a supply voltage is controlled externally of said housing.

9. The interface module of claim 5, further comprising a second multicore cable having a first end and a second end and a first core component coupled to said first terminal and a second core component coupled to said second terminal.

10. The interface module of claim 1, wherein said first coupling component comprises a series of ohmic resistors having a resistive divider connection, said first coupling component coupled between said first and second interface terminals and said multicore cable, said first coupling component optionally coupled to said first and third terminals.

11. The interface module of claim 10, wherein said second coupling component comprises a series of switches coupled between said first coupling component and said first and third terminals.

12. The interface module of claim 11, wherein said second coupling component is operated externally of said housing.

13. The interface module of claim 12, wherein said coupling of said first coupling component to a supply voltage is controlled externally of said housing.

14. The interface module of claim 10, further comprising a second multicore cable having a first end and a second end and a first core component coupled to said first terminal and a second core component coupled to said second terminal.

15. The interface module of claim 1, further comprising a second multicore cable having a first end and a second end and a first core component coupled to said first terminal and a second core component coupled to said second terminal.

* * * * *